United States Patent Office 2,754,618
Patented July 17, 1956

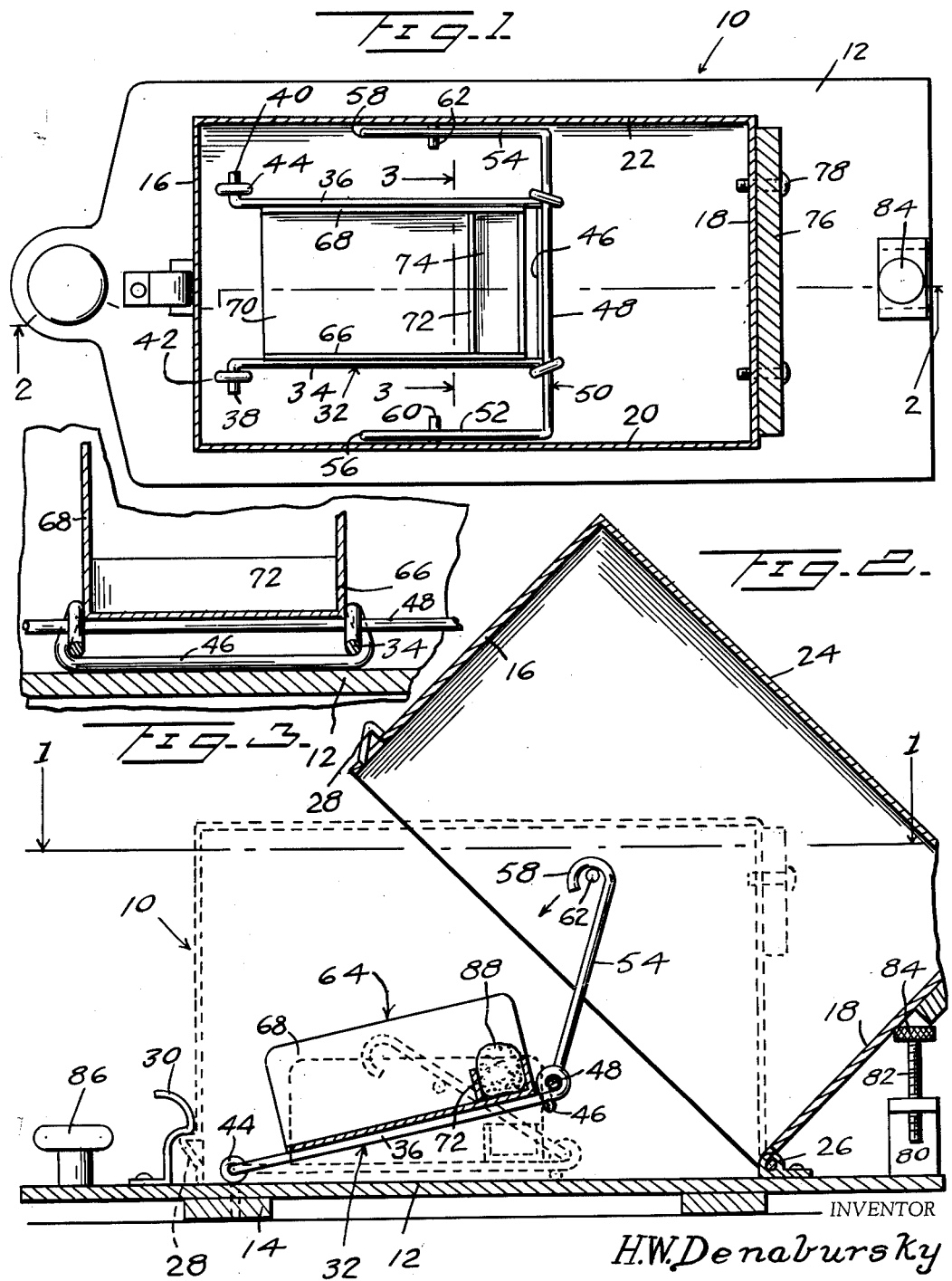

2,754,618
ANIMAL TRAP
Hyman Wolfberon Denabursky, Baltimore, Md.

Application September 22, 1954, Serial No. 457,637

2 Claims. (Cl. 43—62)

This invention relates to animal traps.

An object of this invention is to provide an animal or rodent trap wherein the animal is caught alive. In the embodiment of the invention herein disclosed a flat base has a downwardly opening housing pivoted thereon which is substantially balanced in open position. A bait holder is pivotally connected between the base and the housing. The balance of the housing is such that slight contact with the bait holder or the bait contained therein will overbalance the housing so that the housing will swing downwardly to closed position.

Other and further objects and advantages of this invention will become more apparent from a consideration of the following specification when read in the light of the annexed drawing, in which:

Figure 1 is a cross-sectional view taken on the horizontal line 1—1 of Figure 2, looking in the direction of the arrows, and illustrating the details of a trap constructed in accordance with the teachings of this invention.

Figure 2 is a cross-sectional view taken substantially on the line 2—2 of Figure 1, looking in the direction of the arrows and showing the trap in set position, the dotted lines illustrating the closed position.

Figure 3 is an enlarged detail cross-sectional view taken on the line 3—3 of Figure 1.

Referring now more specifically to the drawing, reference numeral 10 designates, in general, a trap constructed in accordance with this invention. The trap 10 comprises an elongated substantially rectangular flat base member 12 supported on a pair of relatively thin substantially rectangular transversely extending supports 14.

A substantially hollow rectangular closure member having opposed end walls 16, 18, side walls 20, 22, and top wall 24 has the end wall 18 pivotally connected at 26 on the base 12.

The end wall 16 is formed with an outwardly extending latch member 28 which is adapted to be engaged by a spring keeper member 30 when the closure member is pivoted to its dotted line position shown in Figure 2.

An elongated substantially U-shaped bracket member 32 is provided, the opposite arms 34, 36 of which have their respective free ends 38, 40 bent laterally and outwardly for pivotal mounting within a pair of eye screws 42, 44 anchored in the base 12. The bight 46 of the U-shaped member 32 is reverted around the bight 48 of a second U-shaped wire member indicated in general by reference numeral 50 whereby the members 32 and 50 are pivotally connected together.

As is seen in the drawing, the arms 52, 54 of the U-shaped member 50 terminate in hook-like portions 56, 58 which are adapted to engage over a pair of pins 60, 62 which extend inwardly from the side walls 20, 22, respectively, when the trap is in its set position.

An elongated substantially U-shaped ramp 64 having side walls 66, 68 and a bottom wall 70 is supported between the arms 34, 36 of the first-mentioned U-shaped wire member 32. The ramp 64 is traversed adjacent its inner end by a pair of partition walls 72 in order to form a bait compartment 74.

A crossbar 76 extends transversely across the end wall 18 and is secured thereto by means of a pair of screws 78. An internally threaded boss 80 is secured to the base 12 adjacent the end wall 18 and is adapted to receive the shank 82 of a knurled bolt 84, the bolt 84 being adapted for vertical adjustment to engage against the crossbar 76 to serve a function to be described.

To facilitate the handling of this trap, a knob 86 is secured to the base 12 adjacent the end thereof opposite to the end carrying the boss 80.

In operation, the closure member of the above described trap is pivoted to its open position, as shown in full lines in Figure 2, and bait 88 is placed in the bait compartment 74. The bolt 84 is adjusted relative to the end wall 18 and the crossbar 76 so that little pressure need be exerted on the ramp 64 adjacent the bait compartment 74 to cause the closure member to move out of balance and pivot on its hinges 26 to the closed position shown in dotted lines in Figure 2.

With this adjustment, it is obvious that an animal which approaches the bait 88 on the ramp 64 will be trapped, and the same may be subsequently exterminated.

This trap may be made in any size for any animal, for instance, an animal weighing as little as a quarter pound or even one weighing a ton.

Having described and illustrated one embodiment of this invention in detail, it will be understood that the same is offered merely by way of example, and that the invention is to be limited only by the scope of the following claims.

What is claimed is:

1. An animal trap comprising an elongated substantially rectangular base, a substantially hollow rectangular housing having a pair of opposed end walls, a pair of opposed side walls, a top wall and an open lower end, means pivotally connecting one of said end walls of said housing to said base with the open end thereof proximate thereto, vertically adjustable base attached means supporting said housing in set balanced position with the plane of said open end inclined at an angle to said base, an elongated ramp having a pair of opposed ends, a U-shaped frame supporting said ramp and having means pivotally connecting one end of said frame to said base, and a U-shaped member pivotally connecting the other end of said frame to said housing whereby the weight of an animal on said ramp overbalances said housing to cause it to fall against said base and thereby trap said animal.

2. An animal trap comprising an elongated substantially rectangular base, an elongated substantially hollow rectangular housing having opposed pairs of side and end walls, a top wall and an open lower end, means pivotally connecting one of said end walls adjacent said open end to said base, vertically adjustable base attached means supporting said housing in an inclined balanced position over said base when said trap is in its set position, a ramp having a pair of opposed ends and a bait compartment, a U-shaped frame supporting said ramp and having means pivotally securing one end of said frame to said base and a U-shaped member pivotally connecting the other end of said frame to said housing, whereby as an animal approaches said bait compartment the weight thereof will throw said housing out of balance causing it to fall against said base and trap said animal.

References Cited in the file of this patent
UNITED STATES PATENTS

| | | |
|---|---|---|
| 589,183 | Mariner | Aug. 31, 1897 |
| 656,519 | Cross | Aug. 21, 1900 |
| 874,654 | Beaudry | Dec. 24, 1907 |

FOREIGN PATENTS

| | | |
|---|---|---|
| 19,484 | Great Britain | 1892 |